(12) United States Patent
Davis et al.

(10) Patent No.: US 7,461,977 B2
(45) Date of Patent: Dec. 9, 2008

(54) PIVOT ASSEMBLY

(75) Inventors: Benjamin P. Davis, Beatrice, NE (US); Garry W. Busboom, Beatrice, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 776 days.

(21) Appl. No.: 10/933,685

(22) Filed: Sep. 3, 2004

(65) Prior Publication Data

US 2006/0052193 A1    Mar. 9, 2006

(51) Int. Cl.
    *F16C 11/06* (2006.01)
(52) U.S. Cl. .................. 384/206; 384/147; 384/152; 384/213
(58) Field of Classification Search .......... 384/130, 384/147–152, 192, 202, 203, 205–211, 213; 403/56, 123, 131
See application file for complete search history.

(56) References Cited

U.S. PATENT DOCUMENTS

| | | | |
|---|---|---|---|
| 3,142,193 A | 7/1964 | Polko et al. | |
| 3,806,158 A * | 4/1974 | Casey | 384/202 |
| 4,048,787 A | 9/1977 | Harkness et al. | |
| 4,102,114 A | 7/1978 | Estes et al. | |
| 4,213,288 A | 7/1980 | Takeuchi et al. | |
| 4,281,848 A * | 8/1981 | Youngers | 384/203 |
| 4,551,120 A | 11/1985 | Thorney | |
| 4,557,709 A | 12/1985 | St. John | |
| 4,813,215 A | 3/1989 | Chase et al. | |
| 5,058,867 A * | 10/1991 | Hadano et al. | 384/203 |
| 5,284,398 A * | 2/1994 | Sakai | 403/131 |
| 5,809,610 A * | 9/1998 | Eustache | 384/192 |
| 6,422,963 B2 | 7/2002 | Kurose | |
| 6,602,155 B2 | 8/2003 | Buss et al. | |
| 6,651,413 B2 | 11/2003 | Papke | |
| 7,063,342 B2 * | 6/2006 | Seki | 384/147 |
| 2003/0214110 A1* | 11/2003 | Diener et al. | 280/93.51 |

OTHER PUBLICATIONS

"Lazer Z® Air-Cooled Models Parts Manual" Part No. 103-4693 Rev. A, Exmark® Mfg. Co. Inc., 2003.
"Lazer Z® CT Parts Manual" Part No. 103-4114, Exmark® Mfg. Co. Inc., 2002.

* cited by examiner

*Primary Examiner*—Thomas R Hannon
(74) *Attorney, Agent, or Firm*—Mueting, Raasch & Gebhardt, P.A.

(57) ABSTRACT

A pivot assembly to permit relative pivotal motion of a sleeve of the pivot assembly about a pivot axis. The pivot assembly may contain a spherical bearing assembly therein. The spherical bearing assembly may include a spherical portion and a tubular portion, wherein the tubular portion is operable to form a sealing surface, e.g., a sealing member may seal directly with the tubular portion.

31 Claims, 5 Drawing Sheets

PIVOT ASSEMBLY

TECHNICAL FIELD

The present invention relates generally to pivoting mechanisms and, more specifically, to pivot assemblies that allow pivoting of one component relative to another such as, for example, idler assemblies for use in tensioning endless drive members.

BACKGROUND

Vehicles that utilize an endless drive member such as a belt or chain to transfer power are known. For instance, lawn mowing vehicles often use an endless belt routed through a sheave or pulley system to transmit power from a drive sheave, typically attached to a crank shaft of the mower's engine, to one or more driven sheaves located, for example, on a cutting deck of the mower. The driven sheave may, in turn, be connected, e.g., via a secondary drive belt and pulley system, to spindle sheaves operatively coupled to cutting blades beneath the deck (alternatively, the belt powered by the driven sheave may directly engage the spindle sheaves, e.g., a single-belt configuration). Thus, during operation, the drive sheave may selectively drive the spindle sheaves and, thus, the cutting blades.

Typically, an idler sheave is provided with the pulley system to tension the slack or loose side of the drive belt. Tensioning of the drive belt provides various advantages including, for example, providing proper friction between the drive belt and the associated sheaves. Accordingly, belt slippage may be reduced. Tension applied by the idler sheave may also reduce excessive slack in the belt, thereby reducing the chance of the belt becoming disengaged from the sheaves during operation.

Conventional idler sheaves may rotatably attach to an end of an idler arm that pivots about an idler pivot joint. Tension is provided by, for example, an extension spring having one end fixed to mower structure and the other end operatively coupled to the idler sheave. The tension in the spring may force the idler sheave against the belt, thereby tensioning the same. The idler pivot joint may include a housing pivotally secured to the mower with a fastener. Sleeve or roller bearings may be provided to journal the housing relative to the fastener and permit the desired pivoting motion.

While effective, such idler pivot joints have drawbacks. For example, the pivotal motion experienced during operation of the idler pivot joint may be of relatively low angular displacement. As a result, localized premature wear of the sleeve or ball bearings may occur, especially where an adequate lubrication schedule is not observed. To reduce the chance of premature localized failure, manufacturers of some commercially-operated lawn mowing equipment may recommend lubricating idler pivot assemblies frequently, e.g., as often as once a day.

Moreover, operation in dusty or debris-filled environments (as may be common in some lawn mowing applications) often results in debris entering the pivot joint and contaminating the bearing interfaces. Such contamination may result in increased bearing friction, potentially accelerating localized wear and premature idler pivot joint failure.

SUMMARY

Embodiments of the present invention address these and other problems associated with idler pivots and with other types of pivot joints. For example, in one embodiment, a pivot assembly is provided having a sleeve operable to pivot about a pivot axis. A first spherical bearing assembly is positioned within the sleeve, wherein the first spherical bearing assembly includes: an inner ball having a spherical portion and a first tubular portion; and an outer ring positioned between the sleeve and the spherical portion of the inner ball. A sealing member is provided and positioned between the sleeve and the first tubular portion of the inner ball.

In another embodiment, a pivot assembly is provided having a sleeve operable to pivot about a pivot axis. A first spherical bearing assembly and a second spherical bearing assembly are also provided and are both located within the sleeve. Each of the first and second spherical bearing assemblies include an inner ball having a spherical portion positioned between a first tubular portion and a second tubular portion; and an outer ring positioned between the sleeve and the spherical portion of the inner ball. The assembly also includes a first sealing member associated with the first spherical bearing assembly and a second sealing member associated with the second spherical bearing assembly, wherein the first and second sealing members are positioned between the sleeve and the first tubular portion of each of the first and second spherical bearing assemblies, respectively.

In yet another embodiment, a pivot assembly is provided including a sleeve operable to pivot about a pivot axis; and a spherical bearing assembly positioned within the sleeve. The spherical bearing assembly includes: an inner ball having a spherical portion and a tubular portion; and an outer ring positioned between the sleeve and the spherical portion of the inner ball.

In still yet another embodiment, an idler assembly for use with tensioning an endless drive member is provided. The idler assembly includes a rotatable idler sheave for biasing the endless drive member, and an idler pivot assembly operable to permit pivotal motion of the idler sheave about a pivot axis. The idler pivot assembly includes: a sleeve; two spherical bearing assemblies positioned inside the sleeve; and a shaft member passing through the two spherical bearing assemblies and operable to pivotally attach the idler pivot assembly to structure. An idler arm connecting the sleeve to the idler sheave is also included.

The above summary of the invention is not intended to describe each embodiment or every implementation of the present invention. Rather, a more complete understanding of the invention will become apparent and appreciated by reference to the following detailed description and claims in view of the accompanying drawing.

BRIEF DESCRIPTION OF THE VIEWS OF THE DRAWING

The present invention will be further described with reference to the figures of the drawing, wherein.

DETAILED DESCRIPTION OF EXEMPLARY EMBODIMENTS

In the following detailed description of exemplary embodiments, reference is made to the accompanying views of the drawing which form a part hereof, and in which are shown by way of illustration specific embodiments in which the invention may be practiced. It is to be understood that other embodiments may be utilized and structural changes may be made without departing from the scope of the present invention.

Generally speaking, the present invention is directed to pivot assemblies that permit pivotal motion of one component or member relative to another component. One exemplary application of the present invention is to idler assemblies. Idler assemblies are typically utilized to provide a tensioning force to the slack side of a driving member such as an endless, flexible belt. By applying tension to the slack side of the belt, the belt is better able to transmit rotational power from a drive sheave to a driven sheave. The idler assembly may apply its tensioning force through a freely rotating sheave or pulley that is biased against the flexible belt.

Another exemplary application described and illustrated herein relates to pivot assemblies for use with attaching a sulky to a lawn mower. A sulky is a towed device that hitches to a rear side of an otherwise walk-behind vehicle, e.g., mower. The sulky permits an operator to ride (standing or sitting) during vehicle operation.

These embodiments are only illustrative, however, as pivot assemblies in accordance with embodiments of the present invention may find use in most any pivoting application without departing from the scope of the invention.

Figure 1:
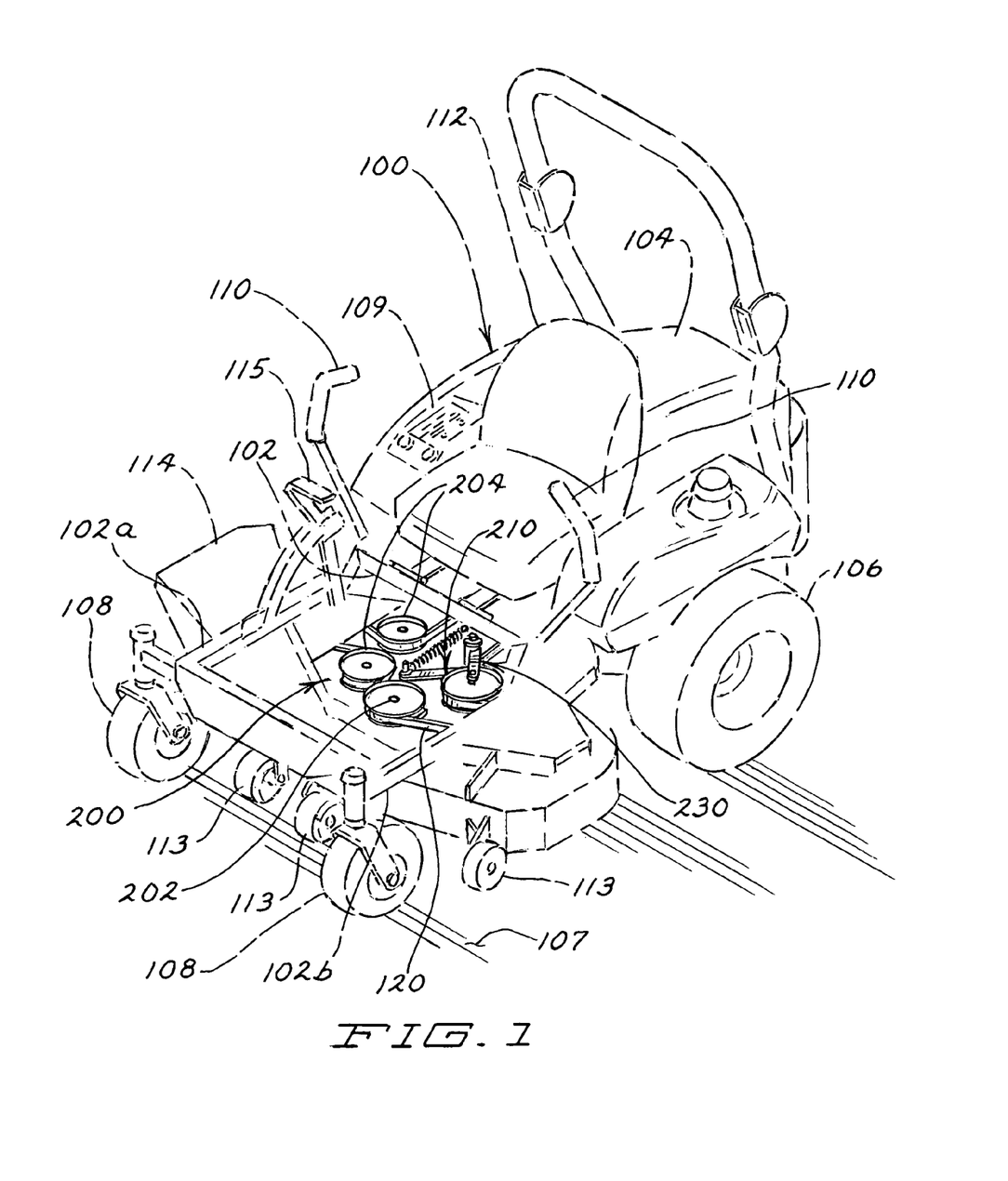
FIG. 1 is a perspective view of a vehicle, e.g., a riding lawn mower, incorporating an exemplary pivot assembly, e.g., idler assembly, in accordance with one embodiment of the invention, the idler assembly shown mounted to a mower deck.

FIG. 1 illustrates an idler assembly 210 in accordance with one embodiment of the present invention as it may be incorporated on a self-propelled, ground maintenance vehicle, e.g., a zero-radius-turning (ZRT) riding lawn mower 100 (also referred to herein simply as a "mower"). In particular, the idler assembly 210 is configured to tension a drive belt associated with a lawn mower cutting deck. However, while the invention is herein described with respect to tensioning of cutting deck drive belts, those of skill in the art will realize that idler assemblies described herein could be used to tension the drive belts of other mower subsystems, e.g., hydrostatic drive motors, auxiliary equipment, etc. Moreover, idler assemblies in accordance with embodiments of the present invention may find application to other types of vehicles (e.g., automobiles, all terrain vehicles, skid-steer loaders, construction/excavation vehicles, or other ground maintenance vehicles) as well as to many non-vehicular applications (e.g., industrial equipment). In fact, idler assemblies as shown and described herein may be utilized in most any application where tensioning of a drive member such as a belt, chain, or rope is desired.

While the general mower configuration is not necessarily central to the invention, it is briefly described below. FIG. 1 clearly illustrates the mower 100 having a frame 102 supporting a prime mover, e.g., an internal combustion engine 104. A left and a right ground engaging drive wheel 106 (only left wheel shown) may be rotatably coupled to left and right sides of a rear portion of the mower 100, respectively. The drive wheels 106 may be independently powered by the engine 104 (e.g., via one or more hydraulic motors, transmissions, or the equivalent) so that the drive wheels 106 may propel the mower 100 along a ground surface 107 during operation.

One or more controls, e.g., left and right drive control levers 110 (shown displaced outwardly for operator ingress/egress in FIG. 1) are also provided. The drive control levers 110 are generally pivotally coupled to the mower such that they may pivot forwardly and rearwardly under the control of an operator sitting in an operator's seat 112. The drive control levers 110 are operable to independently control speed and direction of the respective drive wheels 106 via manipulation of the mower's drive system, e.g., hydrostatic motors, as is known in the art. For example, incremental forward movement (e.g., pivoting about a transverse horizontal axis) of the left (or right) drive control lever 110, from a neutral position, results in an incremental increase in rotational speed of the left (or right) drive wheel 106 in a forward direction. Similarly, incremental rearward movement of the left (or right) drive control lever 110, from a neutral position, results in an incremental increase in rotational speed of the left (or right) drive wheel 106 in a rearward direction.

A pair of front swiveling caster wheels 108, connected to forwardly extending frame rails 102a and 102b, support a front portion of the mower 100 in rolling engagement with the ground surface 107.

Although the illustrated mower has the drive wheels 106 in the rear and the caster wheels 108 in front, this configuration is not limiting. For example, other embodiments may reverse the location of the wheels, e.g., drive wheels in front and caster wheels in back. Moreover, other configurations may use different wheel configurations altogether, e.g., a tri-wheel configuration. Accordingly, other embodiments are possible without departing from the scope of the invention.

A cutting deck 114 (FIG. 1) may be mounted to the lower side of the frame 102, e.g., between the drive wheels 106 and the caster wheels 108. The cutting deck 114 includes one or more cutting blades (not shown), as known in the art, that are operatively powered by the engine 104. Miscellaneous controls 109 permit operator control of various mower functions, e.g., throttle, blade engagement, etc.

During operation, power is selectively delivered to the cutting deck 114 and drive wheels 106, whereby the cutting blades rotate at a speed sufficient to sever grass and other vegetation as the cutting deck 114 passes over the ground surface 107. Typically, the cutting deck 114 has an operator-selectable height-of-cut control 115 to allow adjustment of the cutting deck 114 height relative to the ground surface. The cutting deck 114 may optionally include deck rollers 113 to assist in supporting the cutting deck 114 relative to the ground surface 107 during operation.

Other aspects/features of the mower 100 that are either not central to the invention or are readily known by those skilled in the art may also be included. However, such other aspects/features are not further discussed and/or illustrated herein.

The mower 100 may further include one or more endless drive members, e.g., belts 120, operable to transmit power from a crankshaft-mounted sheave (not shown) of the engine 104 to driven equipment such as the mower deck 114. Where the crankshaft-mounted sheave is oriented for rotation in a vertical plane, the belt 120 may be routed to the horizontal plane shown in FIG. 1 through the use of a mule drive system such as that described and illustrated in U.S. Pat. No. 6,651,413 to Papke.

Figure 2:
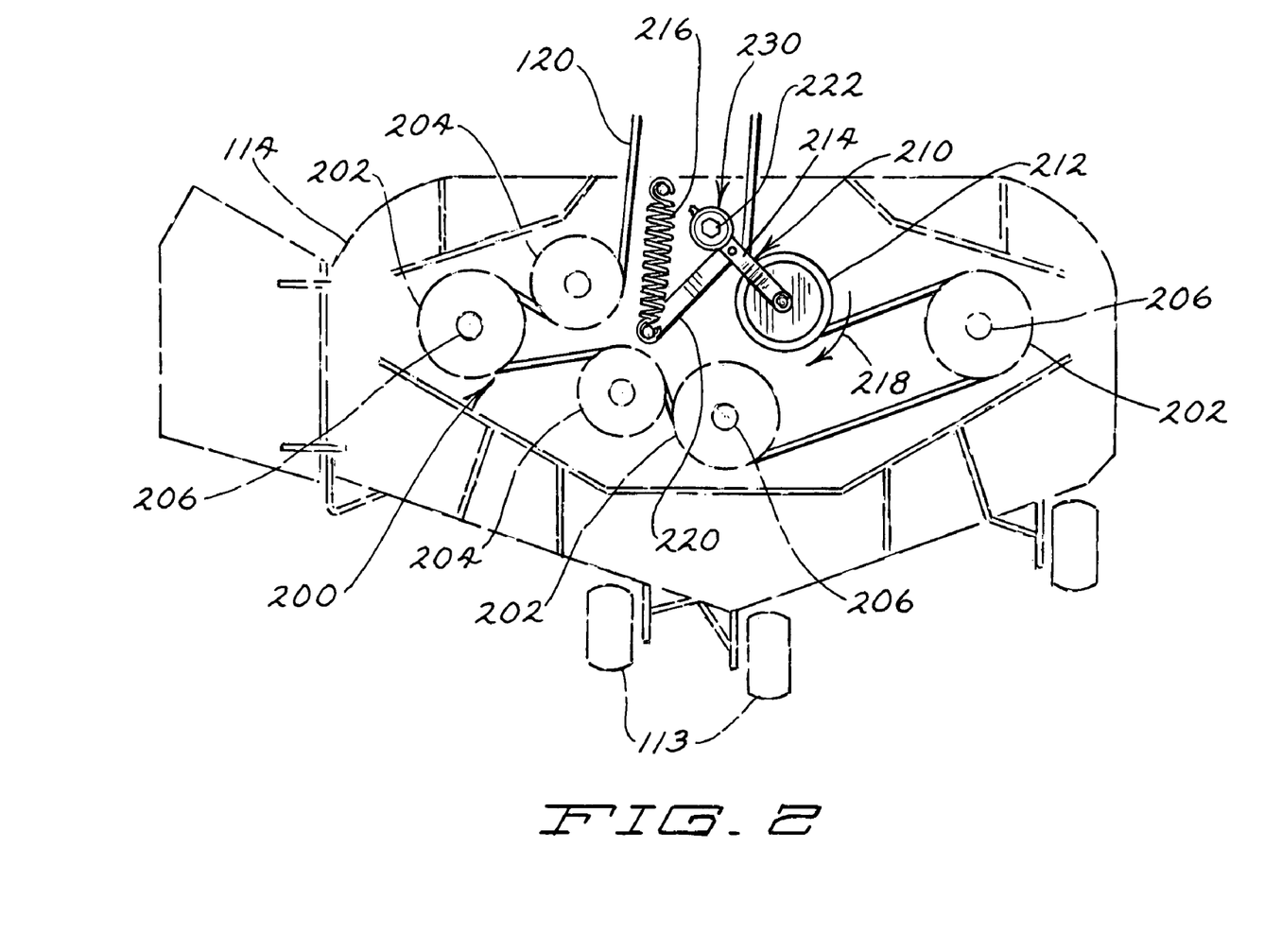
FIG. 2 is a top plan view of the mower deck of FIG. 1.

FIG. 2 illustrates a top plan view of an upper surface of the cutting deck 114 of FIG. 1 with various deck and mower structure removed for clarity. To route the belt 120 to the appropriate locations, a sheave system 200 associated with the cutting deck 114 may be provided. The sheave system 200 may include a series of spindle sheaves 202 (only one shown in FIG. 1) and one or more guide sheaves 204. Each spindle sheave 202 may be coupled to a spindle 206 that extends through the cutting deck 114. Below the cutting deck, each spindle 206 may support a corresponding cutting blade (not shown).

Each guide sheave 204 may be rotatably attached to the upper surface of the cutting deck 114, preferably in a substantially fixed location that ensures adequate contact between the belt 120 and the various spindle sheaves 202. During operation, the spindle sheaves 202 and guide sheaves 204 rotate under the driving power of the belt 120, causing the cutting blades to rotate beneath the deck 114.

To ensure adequate tension is maintained in the belt 120, the sheave system 200 may also include the idler assembly 210. The idler assembly 210, in the illustrated embodiment, may include an idler sheave 212, a pivot assembly (e.g., idler pivot assembly 230), and an idler arm 214, the latter coupling the idler pivot assembly to the idler sheave. A tensioning member, e.g., spring 216, may also be included to bias the idler assembly 210 in the direction 218, thereby tensioning the belt 120 about the spindle sheaves 202 and guide sheaves 204. In the illustrated embodiment, the spring 216 is fixed, at a first end, to structure, e.g., to the cutting deck 114, and, at a second end, to an optional tension arm 220 rigidly attached to the idler arm 214. The tension arm 220 may be provided to permit positioning of the spring 216 in a particular location. However, where space permits, the spring 216 could be attached directly to the idler arm 214.

The idler arm 214 may be coupled to the idler pivot assembly 230, and to the tension arm 220, in most any fashion, e.g., welding, mechanical interlocking, etc., that provides a preferably rigid interconnection. Alternatively, the components could be formed as one piece, e.g., forged. The actual material used to produce the components 214 and 220 (as well as components of the assembly 230) may be selected from most any material, e.g., aluminum or steel, that is able to withstand the stresses associated with operation.

The idler sheave 212 may be rotatably attached to a distal end of the idler arm 214 such that the idler sheave is free to rotate relative to the idler arm. The idler pivot assembly 230, which is coupled to a proximal end of the idler arm 214, may be coupled to the upper surface of the cutting deck 114 so that the entire idler assembly 210 may pivot about a generally vertical pivot axis 222 passing through the idler pivot assembly.

Figure 3:
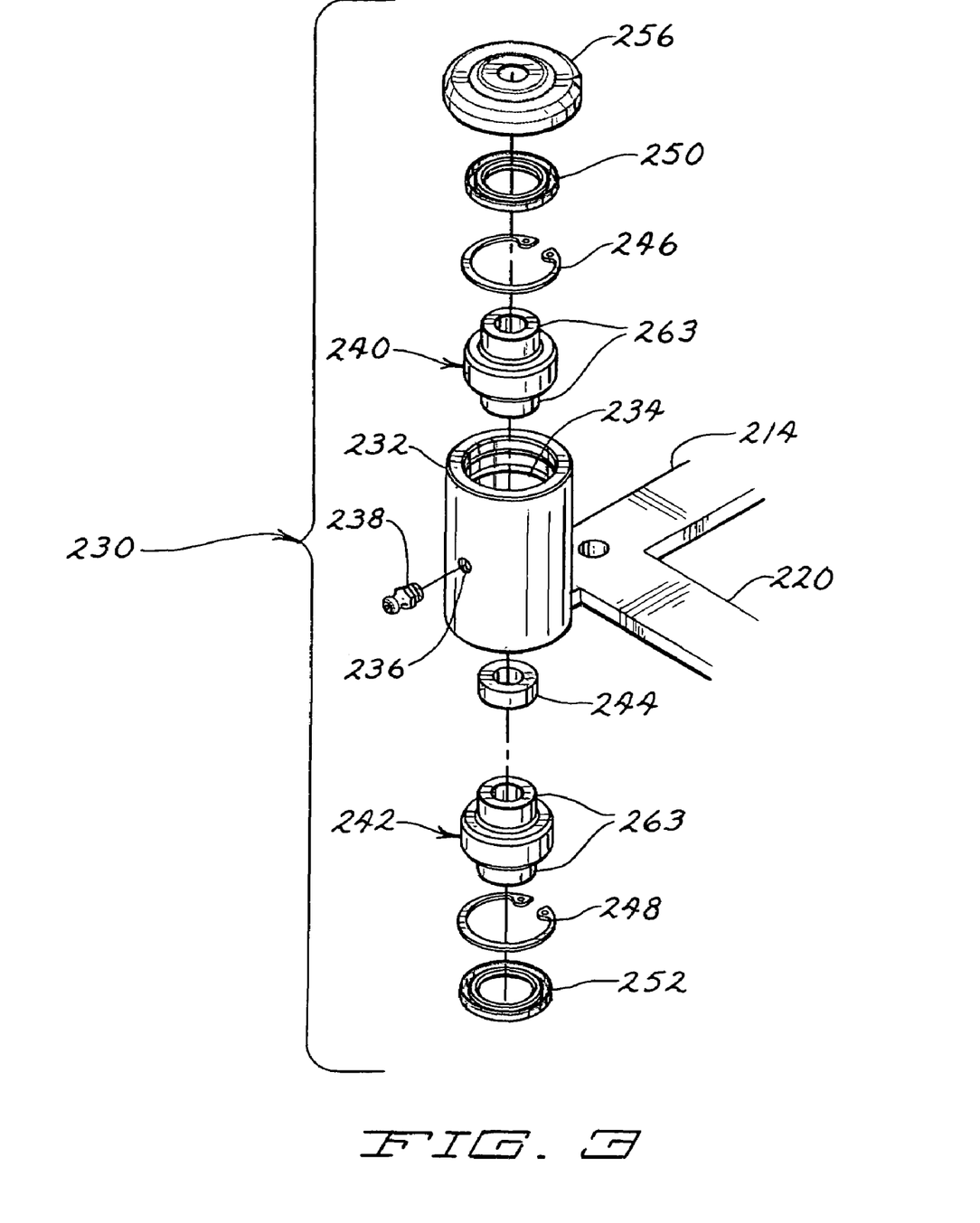
FIG. 3 is an exploded view of an idler pivot assembly in accordance with one embodiment of the invention.
Figure 4:
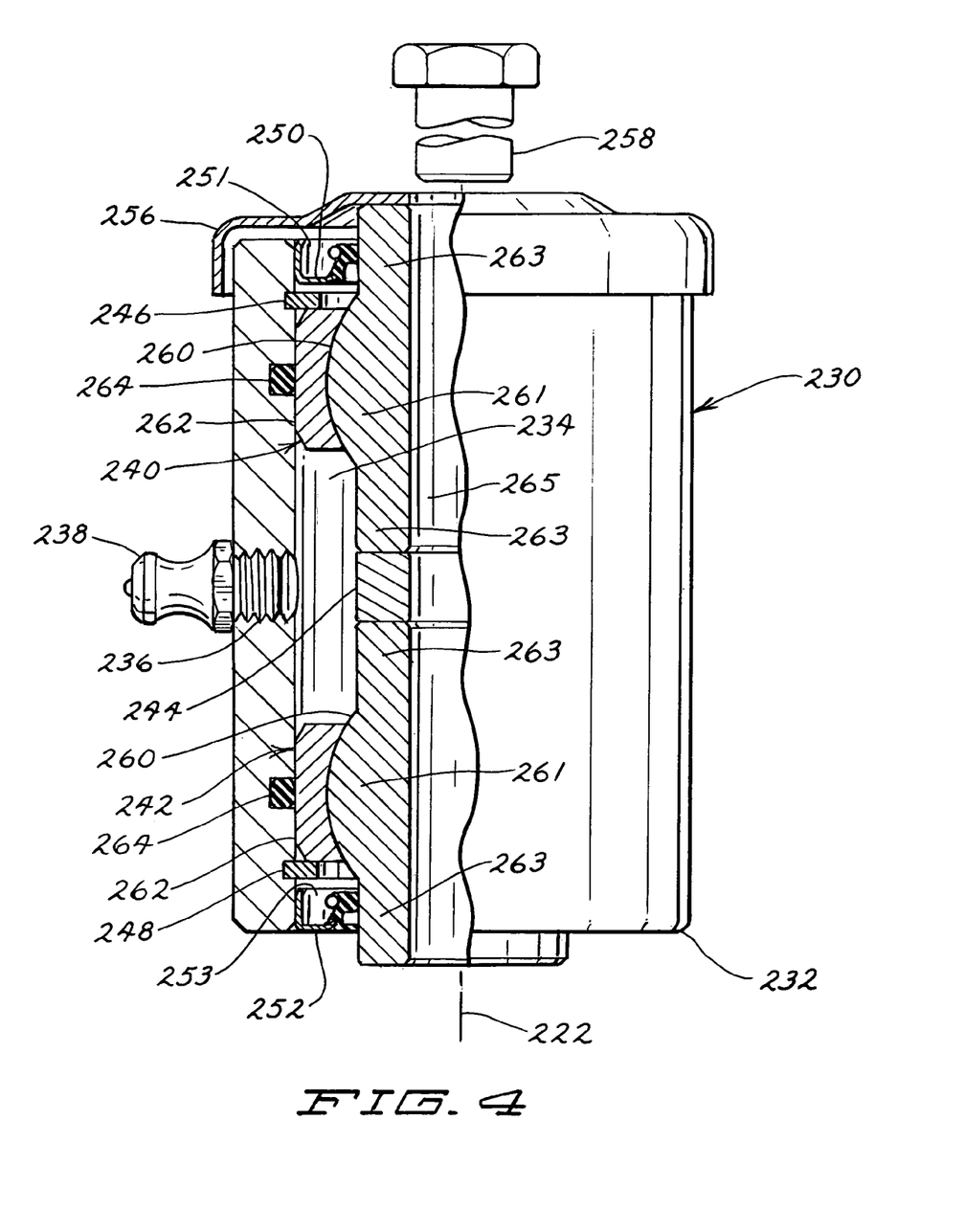
FIG. 4 is a partial section view of the idler pivot assembly of FIG. 3 as assembled.

FIG. 3 illustrates an exploded view of the exemplary idler pivot assembly 230 of FIGS. 1 and 2. FIG. 4 illustrates a cross section of the idler pivot assembly 230 of FIG. 3 as assembled. The idler pivot assembly 230 may include a tubular housing member or sleeve 232 (although the sleeve 232 is shown as substantially cylindrical, tubular members having other shapes are certainly possible). A passageway 234 extending between first and second longitudinal ends of the sleeve 232 may include various features, further described below, that assist in locating and retaining various components of the idler pivot assembly 230. One or more holes 236 may be provided for a lubrication port or fitting, e.g., a zerk fitting 238, for delivering a fluid, e.g., lubricant, into the passageway 234.

While the idler pivot assembly 230 is shown and described herein as being mounted for pivoting about a vertical axis, those of skill in the art will realize that it may be mounted in most any orientation, e.g., for pivoting about a horizontal axis. As a result, the terms "upper," "lower," "top," "bottom," and other like terms are used herein to simplify the description of the exemplary embodiments only, and do not limit the scope of the invention in any way.

The idler pivot assembly 230 may also include first (e.g., upper) and second (e.g., lower) spherical bearing assemblies 240 and 242, respectively (the assemblies 240, 242 may also be referred to herein as "bearings"). A spacer 244 may be provided within the sleeve 232 between the bearing assemblies 240, 242 to provide the desired bearing offset. Bearing retaining members, e.g., upper and lower snap rings 246 and 248, may engage grooves formed on the inner surface of the sleeve 232 and may, in conjunction with the spacer 244, retain the respective bearing assemblies 240, 242 in place relative to the sleeve 232. In one embodiment, snap rings 246 and 248 are positioned proximate an outer portion of the bearing assemblies 240 and 242, respectively.

A first outer sealing member, e.g., upper seal 250, and a second outer sealing member, e.g., lower seal 252, may also be located in the passageway 234 outboard of the snap rings 246 and 248, respectively, e.g., proximate one or both longitudinal ends of the sleeve 232. A seal guard 256 may be located over one or both longitudinal ends of the sleeve 232, e.g., over the upper exposed end of the sleeve, to limit the idler pivot assembly's exposure to contaminants and water. In other embodiments, e.g., where the assembly 230 is oriented horizontally rather than vertically as shown, both longitudinal ends of the sleeve 232 may be covered by a seal guard 256. Alternatively, other embodiments may eliminate the seal guard 256 altogether.

The idler pivot assembly 230 may be secured to structure, e.g., to the top of the cutting deck 114 as shown in FIGS. 1 and 2, with a shaft member, e.g., fastener 258, that may pass through the sleeve 232, the bearings 240, 242, the seal guard 256, and the spacer 244 as indicated in FIG. 4. In one embodiment, the fastener 258 is a ⅜" bolt. When the fastener 258 is appropriately tightened, the idler pivot assembly 230 allows the sleeve 232 to pivot about the pivot axis 222 defined by the shaft member.

Unlike idler pivot assemblies that utilize sleeve or roller bearings, the bearing assemblies 240 and 242 are preferably spherical bearings. Spherical bearings preferably utilize a spherically shaped (e.g., ground) inner ball 260 housed in a mating spherical outer ring 262 (see FIG. 4). While spherical bearings are often characterized for their ability to accommodate moderate misalignment, such bearings may also be of benefit to the oscillatory motion typically experienced in idler pivot applications. That is, spherical bearings may accommodate the relatively continuous oscillatory displacement of an idler pivot assembly without suffering from the premature localized bearing wear often associated with idler pivot assemblies that utilize other bearing configurations.

With reference to FIGS. 3 and 4, the inner ball 260 of each spherical bearing assembly 240 and 242 may include a spherical portion 261 and one or more tubular portions 263. A bore 265 may be provided through the inner ball 260 to receive the fastener 258.

The spherical portion 261 may provide a bearing surface in contact with the outer ring 262. The tubular portions 263 may provide not only a spacing function (e.g., the inner tubular portions may contact or rest against the spacer 244 as shown in FIG. 4), but also, advantageously, a cylindrical sealing surface for the upper and lower seals 250 and 252. For example, the upper seal 250 may be positioned between the sleeve 232 and the outermost tubular portion 263 of the spherical bearing assembly 240, while the lower seal 252 may be positioned between the sleeve 232 and the outermost tubular portion 263 of the lower spherical bearing assembly 242. As a result, sealing of the idler pivot assembly 230 may not require a separate sealing component, e.g., a hardened spacer or a specialized sealing surface on the fastener 258.

In the embodiments shown and described herein, a tubular portion 263 is located adjacent two opposing sides of each spherical portion 261. That is, the inner ball 260 may include the spherical portion 261 sandwiched between a first tubular portion and a second tubular portion. In some embodiments, the spherical portion 261 and the tubular portions 263 may together form an integral, e.g., single, component. Further, while shown as including two tubular portions 263, each inner ball 260 could include only a single tubular portion, e.g., a tubular portion 263 on only one side of the spherical portion 261.

While not wishing to be limited to any specific seal configuration, the lower seal 252 may, in one embodiment, be a lip seal and, more preferably, a double lip seal. The double lip seal may reduce entry of contaminants into the idler pivot assembly 230 while also containing lubricant therein. The upper seal 250 may also be a lip seal, e.g., a single lip seal (as shown) or a multiple (double) lip seal, that is installed in what might be called an inverted configuration, e.g., with an open face 251 (see FIG. 4) facing outwardly from the bearings (facing towards the same longitudinal end of the sleeve as the face of the lower lip seal 252). This inverted position of the upper seal 250 permits fluids in the passageway 234 (e.g., air, lubricant) to exit or extrude past the lip of the upper seal 250, while still reducing the entry of contaminants into the idler pivot assembly 230.

In alternative embodiments, one or both of the lower seal 252 and the upper seal 250 could be positioned with their respective faces 251, 253 oriented differently, e.g., the face 251 of the upper seal 250 could face inwardly and/or the face 253 of the lower seal 252 could face outwardly. Accordingly, each of the seals 250 and 252 could be installed with their open faces 251, 253 oriented either inwardly or outwardly without departing from the scope of the invention.

The idler pivot assembly 230 may also include one or more friction seals, e.g., O-rings 264, which may be positioned at an interface between the sleeve 232 and the outer rings 262. In the illustrated embodiments, the O-rings 264 seat in grooves of the passageway 234, e.g., in grooves formed on an inner surface of the sleeve 232, as shown in FIG. 4. Each O-ring 264 may contact both the sleeve 232 and the outer ring 262 of one of the respective bearing assemblies 240, 242.

The O-rings 264 may restrict passage of lubricant between the outer ring 262 and an inner wall of the sleeve 232. Moreover, the O-rings 264 may provide frictional resistance to movement of the outer ring 262 relative to the sleeve 232. That is, the O-rings 264 may each have, when seated in their respective grooves and prior to bearing installation, an inner diameter that is less than the outer diameter of one or both of the bearing assemblies 240, 242 (less than an outer diameter of the outer ring 262 of one or both of the bearing assemblies). As a result, the outer ring 262 of each bearing assembly may fit within the sleeve 232 with a clearance fit. However, once each bearing assembly is in its correct location, the flexible O-rings 264 may contact the outer rings 262 and substantially restrict relative movement (e.g., rotation) of the outer ring 262 relative to the sleeve 232, i.e., the O-rings 264 may engage the bearing assemblies with an interference fit. This configuration may permit relaxation of manufacturing tolerances of the bore of the sleeve 232.

To lubricate the idler pivot assembly 230, a fluid lubricant (e.g., grease) may be delivered through the zerk fitting 238 into the unoccupied portions of the passageway 234 of the sleeve 232. The lubricant may fill the passageway 234, whereby displaced fluids may escape through the upper seal 250 as discussed above. As more lubricant is added, the passageway may fill, whereby lubricant may extrude through the interface between the upper seal 250 and the upper bearing assembly 240. The lip of the lower seal 252, however, may prevent the extrusion of lubricant through the interface between the lower seal 252 and/or lower bearing assembly 242. As a result, once lubricant is observed extruding from the upper seal 250 and/or seal guard 256, the operator may assume that the passageway 234 is filled and the idler pivot assembly 230 is ready for operation.

Figure 5:
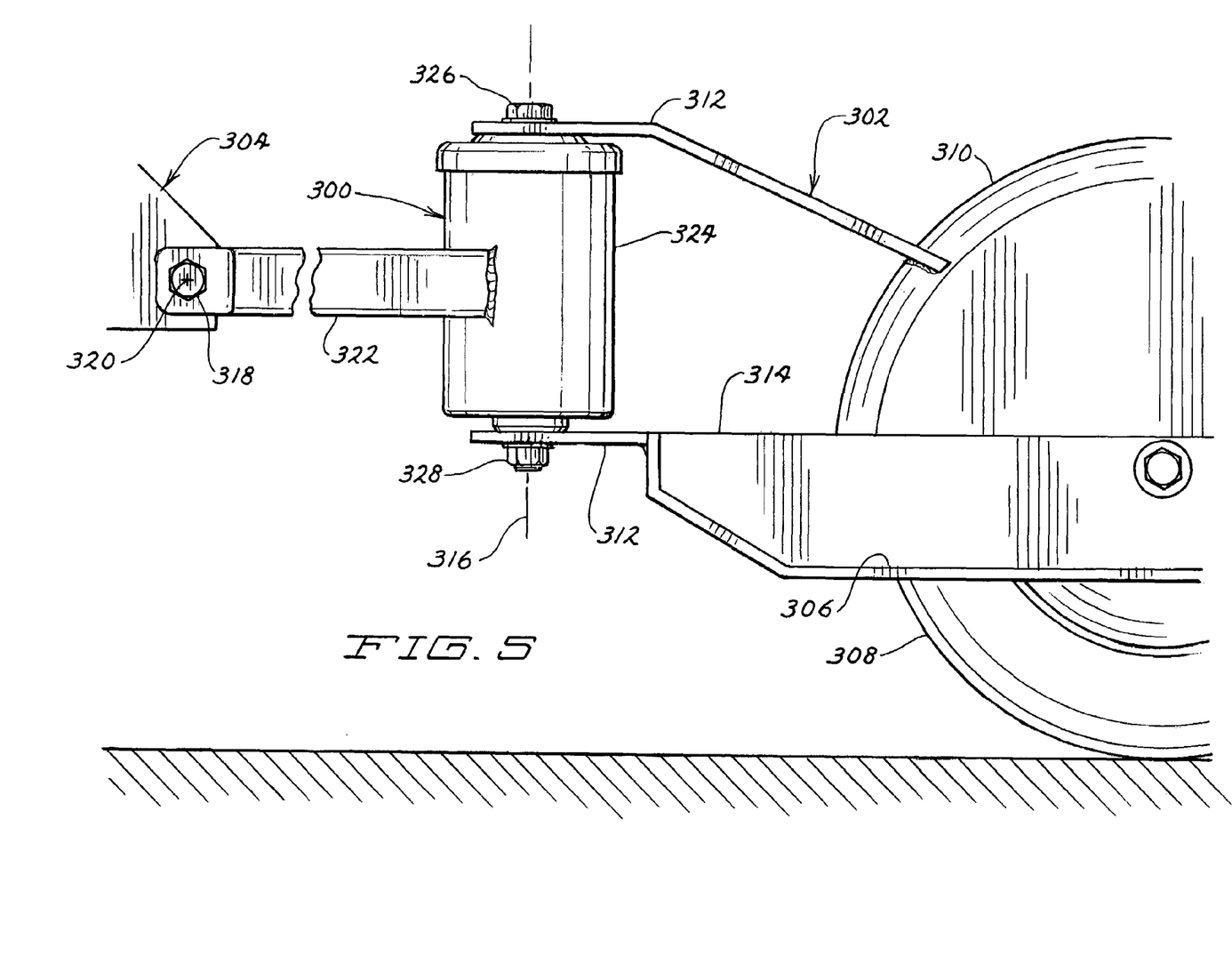
FIG. 5 is a diagrammatic view of a pivot assembly, e.g., a sulky pivot assembly, in accordance with another embodiment of the invention, the sulky pivot assembly coupling a sulky to a lawn mower.

FIG. 5 illustrates a pivot assembly in accordance with another embodiment of the invention. In this exemplary embodiment, the pivot assembly is configured as a sulky pivot assembly 300 used to attach a stand-on or sit-on sulky 302 to a self-propelled lawn mower 304, e.g., a large area walk-behind mower. The sulky pivot assembly 300 may be similar in most respects to the idler pivot assembly 230 already described above (however the idler arm 214 of the assembly 230 has been replaced with an arm 322 described below). As such, further description of the construction of the pivot assembly 300 is unnecessary as this information may be determined from an examination of the description and figures (see, e.g., FIG. 4) of the idler pivot assembly 230 described elsewhere herein.

The sulky 302 may include one or more surfaces 306 upon which an operator may stand during mower operation. When standing on the surfaces 306, the operator may grasp the mower handles (not shown) to control mower operation as is known in the art. The sulky 302 may further include one or more wheels 308 for supporting the sulky 302 in rolling engagement with the ground surface. A fender 310 may cover an upper portion of the wheel 308 to prevent inadvertent operator contact.

A yoke 312 may extend from a forward portion of the sulky 302. The yoke 312, as well as the remaining components of the sulky, may be interconnected by structure 314. The yoke 312 may be configured to permit pivoting of the sulky 302, relative to the mower 304, about a vertical pivot axis 316. The mower 304 may also include a joint 318 that permits pivoting of the sulky 302, relative to the mower 304, about a transverse horizontal axis 320.

An arm 322, pivotally coupled at the joint 318, may be attached, e.g., welded, to a sleeve 324 of the pivot assembly 300 in a manner similar to the attachment of the idler arm 214/sleeve 232 already described above. A shaft member, e.g., fastener 326, may pass through aligned holes in the yoke 312 and through the pivot assembly 300, where it may fasten with a nut 328. The nut 328 may be tightened to clamp the yoke 312 against the bearing assemblies (see, e.g., assemblies 240, 242 of FIG. 4). As with the other embodiments described herein, a zerk fitting (not shown, but similar to the fitting 238 described herein) may be included to permit periodic maintenance, if necessary, of the pivot assembly 300. Thus, like the idler pivot assembly 230, the sulky pivot assembly 300 may permit pivoting of one component relative to another.

Regardless of the particular application, pivot assemblies in accordance with embodiments of the present invention may avoid many problems typically associated with conventional sleeve or roller bearing-type pivot assembly configurations. For example, embodiments of the present invention may utilize spherical bearings to accommodate oscillatory motion of the pivot assembly. As a result, premature and localized bearing wear that may be apparent with other pivot assemblies may be reduced. Further, embodiments of the present invention may utilize a spherical bearing having an inner ball with extensions or tubular portions that permit sealing directly with the inner ball, potentially reducing manufacturing cost and complexity. Moreover, embodiments of the present invention may provide a seal configuration that allows substantially all of the free volume of the pivot assembly to be filled with lubricant. Accordingly, the bearing assemblies may remain adequately lubricated for extended periods, potentially reducing maintenance requirements without adversely affecting component life.

The complete disclosure of the patents, patent documents, and publications cited in the Background, the Detailed Description of Exemplary Embodiments, and elsewhere herein are incorporated by reference in their entirety as if each were individually incorporated.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention. Thus, the invention is limited only by the following claims, and equivalents thereto.

What is claimed is:

1. A pivot assembly comprising:
a sleeve operable to pivot about a pivot axis;
a first spherical bearing assembly positioned within the sleeve, wherein the first spherical bearing assembly comprises:
an inner ball comprising a spherical portion and a first tubular portion; and
an outer ring positioned between the sleeve and the spherical portion of the inner ball;
a sealing member positioned between the sleeve and the first tubular portion of the inner ball; and
a friction seal positioned between the sleeve and the outer ring of the first spherical bearing assembly.

2. The pivot assembly of claim 1, wherein the inner ball further comprises a second tubular portion, wherein the first tubular portion is adjacent a first side of the spherical portion, and the second tubular portion is adjacent an opposing, second side of the spherical portion.

3. The pivot assembly of claim 1, wherein the spherical portion and the first tubular portion form an integral component.

4. The pivot assembly of claim 1, wherein the sealing member is a lip seal.

5. The pivot assembly of claim 1, wherein the friction seal is located in a groove formed on an inner surface of the sleeve.

6. The pivot assembly of claim 1, wherein the friction seal contacts both the sleeve and the outer ring of the first spherical bearing assembly.

7. The pivot assembly of claim 1, wherein the friction seal comprises an O-ring.

8. The pivot assembly of claim 1, further comprising a retaining member operable to locate the first spherical bearing assembly relative to the sleeve.

9. The pivot assembly of claim 8, wherein the retaining member comprises a snap ring operable to engage a groove formed on an inner surface of the sleeve.

10. The pivot assembly of claim 1, further comprising a second spherical bearing assembly.

11. The pivot assembly of claim 10, further comprising a spacer positioned within the sleeve between the first and second spherical bearing assemblies.

12. The pivot assembly of claim 1, wherein the sleeve further comprises a lubrication port.

13. A pivot assembly comprising:
a sleeve operable to pivot about a pivot axis;
a first spherical bearing assembly and a second spherical bearing assembly both located within the sleeve, each of the first and second spherical bearing assemblies comprising;
an inner ball comprising a spherical portion positioned between a first tubular portion and a second tubular portion; and
an outer ring positioned between the sleeve and the spherical portion of the inner ball; and
a first sealing member associated with the first spherical bearing assembly and a second sealing member associated with the second spherical bearing assembly, wherein the first and second sealing members are positioned between the sleeve and the first tubular portion of each of the first and second spherical bearing assemblies, respectively.

14. The pivot assembly of claim 13, wherein the spherical portion, the first tubular portion, and the second tubular portion of each inner ball are formed as a single component.

15. The pivot assembly of claim 13, further comprising a first friction seal associated with the first spherical bearing assembly and a second friction seal associated with the second spherical bearing assembly, wherein the first and second friction seals are positioned between the sleeve and the first and second spherical bearing assemblies, respectively.

16. The pivot assembly of claim 15, wherein the first and second friction seals comprise O-rings.

17. The pivot assembly of claim 13, further comprising a spacer positioned in the sleeve between the first and second spherical bearing assemblies.

18. The pivot assembly of claim 17, wherein the spacer contacts the second tubular portion of each of the first and second spherical bearing assemblies.

19. The pivot assembly of claim 13, further comprising a shaft member operable to pass through the first and second spherical bearings assemblies.

20. The pivot assembly of claim 13, wherein the second sealing member is operable to substantially contain a lubricating fluid within the sleeve, and the first sealing member is operable to permit the lubricating fluid to extrude from the sleeve.

21. The pivot assembly of claim 20, wherein the first and second sealing members comprise lip seals each having an open face, wherein the open face of each lip seal, when assembled with the pivot assembly, faces towards a first longitudinal end of the sleeve.

22. A pivot assembly comprising:
a sleeve operable to pivot about a pivot axis;
a first spherical bearing assembly positioned within the sleeve, wherein the first spherical bearing assembly comprises:
an inner ball comprising a spherical portion and a first tubular portion; and
an outer ring positioned between the sleeve and the spherical portion of the inner ball;
a sealing member positioned between the sleeve and the first tubular portion of the inner ball;
a second spherical bearing assembly; and
a spacer positioned within the sleeve between the first and second spherical bearing assemblies.

23. The pivot assembly of claim 22, wherein the inner ball of the first spherical bearing assembly further comprises a second tubular portion, wherein the first tubular portion is adjacent a first side of the spherical portion, and the second tubular portion is adjacent an opposing, second side of the spherical portion.

24. The pivot assembly of claim 22, wherein the spherical portion and the first tubular portion of the inner ball form an integral component.

25. The pivot assembly of claim 22, wherein the sealing member comprises a lip seal.

26. The pivot assembly of claim 22, further comprising a retaining member operable to locate the first spherical bearing assembly relative to the sleeve.

27. A pivot assembly comprising:
- a sleeve operable to pivot about a pivot axis, wherein the sleeve comprises a lubrication port;
- a spherical bearing assembly positioned within the sleeve, wherein the spherical bearing assembly comprises:
  - an inner ball comprising a spherical portion and a-first tubular portion; and
  - an outer ring positioned between the sleeve and the spherical portion of the inner ball; and
- a sealing member positioned between the sleeve and the first tubular portion of the inner ball.

28. The pivot assembly of claim 27, wherein the inner ball further comprises a second tubular portion, wherein the first tubular portion is adjacent a first side of the spherical portion, and the second tubular portion is adjacent an opposing, second side of the spherical portion.

29. The pivot assembly of claim 27, wherein the spherical portion and the first tubular portion form an integral component.

30. The pivot assembly of claim 27, wherein the sealing member comprises a lip seal.

31. The pivot assembly of claim 27, further comprising a retaining member operable to locate the spherical bearing assembly relative to the sleeve.

* * * * *